(12) United States Patent
Ingels et al.

(10) Patent No.: US 7,837,758 B2
(45) Date of Patent: Nov. 23, 2010

(54) METHOD FOR PRODUCING A FERTILIZER CONTAINING UREA AND AMMONIUM SULPHATE

(75) Inventors: Rune Ingels, Stathelle (NO); Xavier Rondeau, Compiegne (FR); Francois Ledoux, Osny (FR)

(73) Assignee: Yara International ASA, Oslo (NO)

( * ) Notice: Subject to any disclaimer, the term of this patent is extended or adjusted under 35 U.S.C. 154(b) by 499 days.

(21) Appl. No.: 11/631,127

(22) PCT Filed: Jun. 30, 2005

(86) PCT No.: PCT/NO2005/000243

§ 371 (c)(1),
(2), (4) Date: Mar. 19, 2007

(87) PCT Pub. No.: WO2006/004424

PCT Pub. Date: Jan. 12, 2006

(65) Prior Publication Data

US 2008/0092614 A1    Apr. 24, 2008

(30) Foreign Application Priority Data

Jul. 1, 2004   (NO) .................................. 20042782

(51) Int. Cl.
*C05C 9/00*   (2006.01)
(52) U.S. Cl. ........................................................ 71/28
(58) Field of Classification Search ...................... 71/28
See application file for complete search history.

(56) References Cited

U.S. PATENT DOCUMENTS

| | | | | |
|---|---|---|---|---|
| 2,056,283 A | * | 10/1936 | Lawrence et al. ........... | 423/550 |
| 3,785,796 A | | 1/1974 | Mann, Jr. | |
| 3,928,015 A | | 12/1975 | Siegel et al. | |
| 4,116,664 A | * | 9/1978 | Jones .............................. | 71/29 |
| 4,134,750 A | * | 1/1979 | Norton et al. ................... | 71/29 |
| 5,135,561 A | * | 8/1992 | Boles ............................ | 71/28 |

FOREIGN PATENT DOCUMENTS

| | | |
|---|---|---|
| DE | 100 01 082 | 8/2001 |
| WO | 01/51429 | 7/2001 |

OTHER PUBLICATIONS

Jones et al., US Defensive Publication T101,803, May 4, 1982.
Examination Report dated Jun. 25, 2010 in Indian Application No. 269/DELNP/2007 corresponding to the present U.S. Applciation.

\* cited by examiner

*Primary Examiner*—Wayne Langel
(74) *Attorney, Agent, or Firm*—Wenderoth, Lind & Ponack, L.L.P.

(57) ABSTRACT

Method for the production of solid urea ammonium sulphate (UAS) fertilizers from sulphuric acid, ammonia and urea, wherein free ammonia and/or as carbamate to be decomposed from urea production, is reacted with sulphuric acid without substantially decomposing urea in the process stream, where after urea and ammonium sulphate (AS) is mixed and particulated. The point of integration of the ammonium sulphate production in the urea production process is chosen according to the desired product composition. The reaction is carried out in a pipe reactor where the head of the reactor enhanced the chemical reaction between sulphuric acid and ammonia and the urea solution surrounds the ammonium sulphate formation.

19 Claims, 2 Drawing Sheets

METHOD FOR PRODUCING A FERTILIZER CONTAINING UREA AND AMMONIUM SULPHATE

The invention concerns a method for producing a fertilizer containing urea and ammonium sulphate (AS). AS is synthesized directly in the urea solution using pipe reactor (PR) technology.

BACKGROUND

Urea is the most common nitrogen containing fertilizer, its consumption worldwide has been considerably increased, from ~20 millions tons in the early seventies to ~100 millions tons at the beginning of twenty first century. Nitrogen is the basic constituent for any living system (protein).

Due to intensive farming and reduction of emissions of sulphur in the air by industry and subsequent supply to the ground via rain, modern agriculture requires sulphur in addition to nitrogen.

Good agricultural practice usually require N and S in a ratio 10/1 to 5/1 in order to answer to the crop demand, for example 150 kg N/ha/year of N and 30 kg S/ha/year.

Lack of sulphur results both in lower quantity and lower quality of crops, and sulphur deficiency is often reflected in the content and type of proteins. Sulphur is indeed a major element entering into the chemistry of the bio cells, in molecules such as amino acids (cystine, methionine, etc). It is also a catalyst for the photosynthesis and, in some cases, may improve the fixation of atmospheric nitrogen.

Sulphate ions are readily available to the plant, whereas elemental sulphur first has to be oxidised by ground bacteria.

For all these reasons, urea ammonium sulphate (UAS), obtained through mixing of urea and ammonium sulphate appears to be a highly interesting compound fertilizer comprising at the same time nitrogen on one hand, and sulphur in sulphate form, readily available for the crop, on the other hand. Some percent of elemental sulphur may be added in addition in order to have some slow release effect of sulphur through the agricultural season.

AS can be either added to the urea solution prior to solidification (granulation, prilling, . . . ) as finely ground crystals, or can be directly synthesized in the urea solution or in the recycled flow as described in this patent.

Sulphur can be added as a molten salt in the urea solution or co-sprayed with UAS in the granulator.

Commercial grades of UAS should advantageously contain between 5% and 15% of sulphur and between 31 and 40% of nitrogen, which represents proportions from 2:3 to 4:1 of urea to ammonium sulphate. The N/S ratio can in such way be tailored to the crop demand or to the market request.

Description of Urea Synthesis Processes

All the commercial production of urea is from carbon dioxide and ammonia. The reaction proceeds in two steps, first with the formation of carbamate and second with the dehydration of carbamate into urea and water.

Urea is synthesized starting from $CO_2$ and $NH_3$ as raw materials. Thanks to the operating conditions (temperature and pressure), $CO_2$ and $NH_3$ combine easily into carbamate, simultaneously dehydrated to give urea and water.

The reaction is in two steps:

$$2NH_3 + CO_2 \Leftrightarrow NH_2COONH_4$$

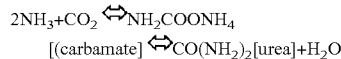$\Leftrightarrow CO(NH_2)_2 [urea] + H_2O$

Both reactions take place in the liquid phase, whereas the raw materials ammonia and carbon dioxide are under gaseous phase.

The reactions are not total, but equilibrated. Thus ammonia is introduced in excess to the stochiometry in order to increase the conversion yield into urea.

The conversion yield per pass achieved in a typical urea production process (e.g. Stamicarbon as described for example in the "fertilizer manual", chapter IX, edition printed in 1998 by IFDC) is around 80% of the urea, which could be potentially synthesised (i.e. the whole $CO_2$ converted into urea and the excess ammonia remaining). The conversion of the raw materials is not completed in one pass, therefore the processes can be:

a once through process,
partial recycle process,
total recycle process.

Once through and partial recycle processes mean that the unconverted raw materials are used in another production, e.g. ammonia to be used in a co-production of ammonium sulphate or ammonium nitrate. In such case, the carbon dioxide, which is nothing more than a low value by product of the ammonia synthesis, is usually vented to the atmosphere.

In once through process (e.g. Mitsui Toastu), raw materials are pumped to the urea reactor at about 200° C. and 200 bars. Urea excess in the reactor can be of 100-110% and NIC ratio is around 3.5. About 35% of the ammonia is converted to urea. Unreacted ammonia is separated and recycled at high pressure. The reactor effluent contains about, 80% urea solution after carbamate stripping. A large amount of ammonia must be used in some other processes (as described for example in the "fertilizer manual", chapter IX, edition printed in 1998 by IDC).

Any co-production means less flexibility and most new plants are based on the total recycle process; all the unconverted raw materials are recycled to the urea reactor. The philosophy for these processes is as follows:

first, urea is synthesised in a high pressure (usually between 13-220 bars) high temperature (usually between 150-210° C.) reactor, allowing the conversion into carbamate and urea of the raw materials, second, the flow from the reactor is then submitted to successive stages of pressure lowering and decomposition of the carbamate. Ammonia and carbon dioxide with some water are therefore stripped off the solution and the remains in the solution is mainly urea and water, third, this urea solution may be either crystallized or concentrated further until adequate concentration for finishing process (prilling or granulation).

Subsequently, the urea-unconverted reactants are recovered thanks to pressure lowering, flash and stripping as mentioned previously. The gaseous streams are then condensed into a carbamate solution and pumped back to the urea synthesis reactor.

For instance in Stamicarbon urea synthesis process (total recycle process) $NH_3$ and $CO_2$ are converted into urea via ammonium carbamate at a pressure of approximately 140 bar and a temperature of 180-185° C. The molar $NH_3/CO_2$ ratio in the reactor is around 3. This results in a $CO_2$ conversion of 60% and a $NH_3$ conversion of 41%.

The reactor effluent containing unconverted $NH_3$ and $CO_2$ is stripped at reactor pressure using $CO_2$ as a stripping agent. The thermal effect and stripping effect lead to the decomposition of about 85% of the residual carbamate, and at a conversion of ~80% of the carbon dioxide into urea in the liquid stream exiting the stripper.

The remaining $NH_3$ and $CO_2$ in the stripper effluent are vaporized in a 4 bar decomposition stage and subsequently condensed to form a carbamate solution, which is recycled to the synthesis section. Further concentration of urea solution takes place in the evaporation section where a e.g. 96% melt is produced to be sprayed in a granulator or prilled.

Unconverted ammonia depending on process conditions (pressure and temperature) may be found as carbamate, carbonates (different combinations of $NH_3$ and $CO_2$) or ammonia The signification of carbamate used hereafter has to be understood as unconverted raw materials in urea and does not correspond to the specific chemical compound but to a family of products depending on mole ratios, temperature and pressure, comprising ammonium carbonate, carbamate, sesquicarbonate, etc.

In some other processes (Snamprogetti, Mitsui Toatsu . . . ) higher N/C ratio, approximately 3.5 are operated in the reactor. The surplus ammonia is separated and recycled at high pressure. In these processes the condensation and recycling of ammonia excess as pure and water free is done to avoid water recycle. In these processes the condensation capacity of ammonia limit the urea reactor yield increase.

In Situ UAS Production

This unconverted ammonia can be neutralized by sulphuric acid to produce UAS.

AS synthesis reaction results from association of two ammonia molecules with one sulphuric acid molecule. Both AS and water are produced by the reaction. The heat of reaction, however, can be used as an energy source to evaporate water, for the concentration of the resulting urea ammonium sulphate (UAS) solution. AS synthesis reaction is particularly exothermic.

Two main technical steps have been identified and are required for UAS production starting from an aqueous urea solution: AS synthesis in urea and UAS solution concentration. On one hand AS synthesis is performed from reaction between sulphuric acid and ammonia (free or linked as carbamate). On the other hand the UAS solution is concentrated thanks to the heat of reaction released during the synthesis in the reactor and by an evaporator if necessary.

Successful and economical AS synthesis reaction and UAS production are closely related to operating conditions and process design. The invention considers new processes (3 routes) to produce UAS. The processes will be described hereafter. The invention concerns a complementary unit operation based on pipe reactor technology by which the synthesis reaction is performed.

PRIOR ART

Current commercial production of UAS is accomplished by physically mixing the two compounds by a process of adding pulverized solid ammonium sulphate to molten urea in a granulation step such as a drum or a pan, as described in U.S. Pat. No. 3,785,796. This can be called the "solid route". It appears as a rather simple process. It presents however some serious drawbacks: from an economical point of view and from a process point of view. AS is cheaply available as a by-product from other industries, such as the caprolactam industry. However, it contains some fluctuating impurities. It is therefore important to secure constant and stable quality of AS to maintain the aspect of the final granulated UAS, which is an important marketing issue.

In order to get a homogeneous and well-rounded product, AS crystals to be used in such solid route need to be finely crushed before mixing with the urea. Crushing of AS generates very corrosive dust, deteriorating the working conditions in the building and enhancing corrosion on the surroundings, increasing significantly not only the crushers' maintenance but the maintenance costs of the whole plant. Moreover, very fine solid particles of AS do also easily cake. Such phenomena mean loss of productivity during shutdown and special care, i.e. extra costs, to prevent such incident.

These disadvantages of the "solid" route can be avoided thanks to a "liquid" route, i.e. using ammonia and sulphuric acid as raw materials rather than AS crystals.

AS synthesis reaction in urea solution is described in U.S. Pat. No. 3,928,015 as a reaction in two steps. A bisulphate solution and ammonia react in the urea solution to produce essentially anhydrous AS in admixture with molten urea in a simple and inexpensive tank type or pipe type reactor.

Bisulphate corresponds to the product made by reacting one mole of sulphuric acid with one mole of ammonia, whereas ammonium sulphate corresponds to the product made by reacting one mole of sulphuric acid with two moles of ammonia. The first ammoniation of sulphuric acid (leading to bisulphate) is more exothermic than the second one.

The reaction of sulphuric acid with ammonia is strongly exothermic and the heat released by such reaction performed in situ therefore allows concentration the urea solution and thus saving of steam utilities. Nevertheless, to perform in situ of AS in urea solution is a challenge, since the acid promptly reacts with urea leading to urea losses. This significantly limits the advantages of any liquid route versus solid route for the production of UAS, if the losses are too high.

Bisulphate is less aggressive to urea than sulphuric acid. According to U.S. Pat. No. 3,928,015 bisulphate is synthesized separately in order to minimize the urea decomposition. By this it does not take the full advantage of the heat released by the first ammoniation. In the process described in this patent the expensive crushing step required in the solid route is avoided, but they are taking advantage of the heat released by the second ammoniation only.

WO 01/51429 relates to a method for producing a fertilizer containing ammonium sulphate and urea. An aqueous urea solution is provided which, with regard to the total weight of the solution, contains 0.1 to 50 wt. % of free ammonia and/or of ammonia that is bound in the form of ammonium carbamate. Said aqueous urea solution is reacted with sulphuric acid and, optionally, with ammonia at a temperature ranging from 25 to 250° C. and at a pressure ranging from 0.1 to 250 bar. A urea-ammonium sulphate solution or suspension is formed in quantities that result in a weight ratio of ammonium sulphate to urea in this urea-ammonium sulphate solution or suspension that ranges from 10:90 up to 65:35. Carbon dioxide and ammonia expelled under these conditions are returned to the urea synthesis. Afterwards, this urea-ammonium sulphate solution or suspension is subjected to a subsequent processing in order to produce solid or liquid fertilizers.

The principle of the in situ reaction is described, without detailing the technology to achieve such a result without high urea losses. Such a patent takes full advantage of the heat released in situ by the synthesis of ammonium sulphate but gives no advantages on the urea global throughput.

The object of the invention is to produce urea ammonium sulphate with an increased urea conversion in the urea synthesis reactor. Another object is to be free to vary the content of AS in UAS. A further object is to perform the process without substantial reaction between urea and sulphuric acid.

These and other objects of the invention are obtained with the method as described below, and the invention is further defined and characterized by the accompanying patent claims.

The invention thus concerns a method for production of solid urea ammonium sulphate (UAS) fertilizers from sulphuric acid, ammonia and urea, wherein free ammonia and/or as carbamate to be decomposed from urea production, is reacted with sulphuric acid without substantially decomposing urea in the process stream. Urea and ammonium sulphate is further mixed and particulated. The point of integration of ammonium sulphate production in the urea production process is chosen according to the desired product composition. The reaction is preferably carried out in a pipe reactor where the head of the reactor enhances the chemical reaction between sulphuric acid and ammonia and the urea solution surrounds the ammonium sulphate formation. The pressure drop through the reactor is between 0 and 10 bars and the temperature of the reactor is kept between 120 and 200° C. In order to achieve a higher content of AS in the UAS, additional ammonia could be fed either through the urea reactor or directly to a pipe reactor. The heat of reaction for AS production is preferably used for concentration of the UAS solution. Elemental sulphur divided into fine droplets could be added to the UAS.

The process could be carried out utilizing an increased through put of ammonia to increase the formation of urea in the reactor, by increasing the N/C ratio and extracting the surplus ammonia from the water containing carbamate recycle stream for ammonium sulphate formation. Alternatively the carbamate recycle could be reduced and the surplus ammonia rich carbamate could be used for the formation of ammonium sulphate without recycling of carbon dioxide to the synthesis. The surplus carbon dioxide could also be recycled to the synthesis through an expansion in the carbon dioxide compressor capacity.

Urea solution is preferably flashed in a first separator tank before liquid urea/carbamate solution is reacted with sulphuric acid in a first pipe reactor. The liquid stream from the first separator and sulphuric acid is injected to produce more UAS, before concentration and particulation. It is preferred to produce 1-35 weight % AS in the second pipe reactor. The heat of reaction for AS production is utilized for concentration of the UAS solution. One part of the urea/carbamate/water stream from the urea reactor could be reacted with sulphuric acid to make UAS-slurry, while carbamate from another part of the stream is decomposed, the resulting urea solution concentrated and mixed with the other stream before particulation of UAS. The vapour phase from the carbamate decomposition is preferably supplied to the pipe reactor. The stream is divided ⅓-⅔ to ⅔-⅓ or in any suitable proportion between these values. The heat of reaction for AS and vapour pressure control in the pipe reactor separator allows concentration of the UAS solution.

The invention will be further illustrated with reference to the FIGS. 1-3, where FIG. 1 shows a schematic representation of the process with in situ synthesis of UAS in the urea carbamate recycled solution using two pipe reactors.

Figure 1:
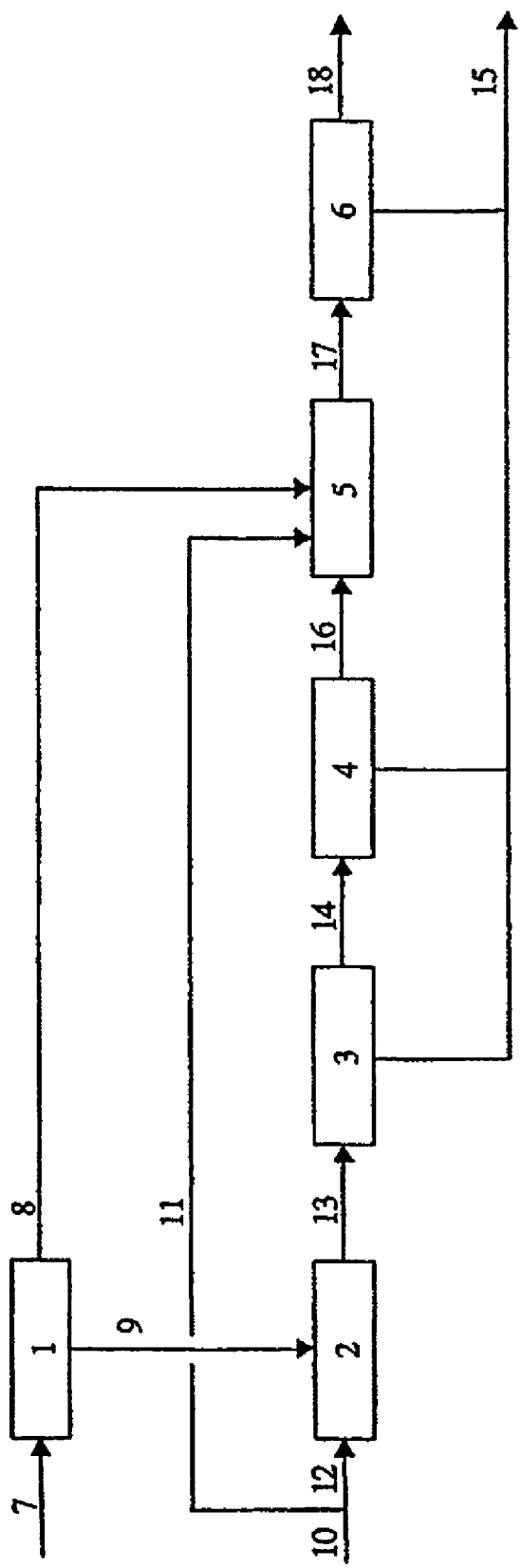

The invention concerns three advantageous routes to produce UAS allowing to increase urea conversion in the urea synthesis reactor, to save utilities and to optimise some plant recycling (off gases, carbamate weak solutions etc.). In addition, it is possible to add some elemental sulphur to get some slow S-release effect and sulphur available for the crop during the whole season.

AS in situ synthesis can be performed in the urea carbamate solution that is normally recycled (routes 1 & 2) or in the final urea solution (route 3) after carbamate stripping.

Optimisation of Urea Synthesis Process Via UAS Production

Water is a co-product of the urea synthesis. Therefore any recycle of water to the urea reactor lowers the conversion of raw materials ($CO_2$ and $NH_3$) into urea and water. In the urea processes unconverted raw materials are usually recycled to the urea reactor as a carbamate/water solution.

Reaction of ammonia/carbamate with sulphuric acid in a pipe reactor (UAS processes) leads to changes in the composition of the recycle to urea reactor. The water contained in the urea/carbamate/water solution, which is used in the AS synthesis, is not recycled to the urea synthesis reactor, as it is further processed in the UAS synthesis route.

The carbon dioxide is either vented to atmosphere, or recycled to the process after ammonia scrubbing and cooling. The water is thus condensed while the carbon dioxide can be recovered and further processed as a gaseous phase.

Another recovery method is to absorb selectively carbon dioxide from the steam/carbon dioxide stream. Indeed, the stream that should be recycled comprises basically ammonia, carbon dioxide and water combined in solution as carbamate. As soon as the ammonia is converted into ammonium sulphate, the water can be released as steam to atmosphere after ammonia scrubbing. It can also be sent, if condensed, to the existing liquid effluents treatment section. The carbon dioxide is either vented to atmosphere or absorbed selectively from the steam/carbon dioxide stream, after ammonia scrubbing, in a solvent such as MEA (mono-ethanol-amine). The carbon dioxide can then be desorbed by simple heating and recompressed to be recycled to the urea synthesis or used in any other way.

Urea Yield Increase

Less water in the recycled stream improves the conversion in the urea reactor. Instead of 80% conversion to urea per pass, e.g. 82% conversion can thus be obtained and the recycling section is proportionally less loaded.

This recycling section is a more important bottleneck than the urea reactor itself if the urea capacity should be increased. In all urea processes ammonia is introduced into the reactor in excess to promote the conversion of carbon dioxide and ammonia into urea. If the excess of ammonia is further increased, the conversion would be increased. However, also the load on the recycling section would be increased, as there would be more ammonia to be recovered. In such a case, the recycling section limits the increase of urea production.

In the same way, if less water is recycled to the urea reactor, the conversion of carbon dioxide and ammonia into urea will automatically be increased, and the plant capacity can be increased provided there are no other bottlenecks. That is why a urea reactor in a once through process is smaller than a reactor in a total recycle process for an equivalent urea capacity.

It is exactly what is performed thanks to the UAS in situ synthesis as described herein:

The load (unreacted ammonia and carbon dioxide together with some water) on recycling section is reduced since ammonia/carbamate is used to produce ammonium sulphate.

Less water is recycled to the reactor, thus the yield of conversion per pass is improved (typically 82% instead of 80%) which in turn reduces the load on the recycling section.

The synthesis of ammonium sulphate is exothermic, providing extra water evaporation capacity and reducing the load on the evaporators.

The N/C ratio can be increased further in the urea reactor, since extra ammonia is required in the system for the formation of AS, resulting in an even higher urea conversion in the urea reactor.

Provided the ammonium sulphate content in the final product is 20% or more, the global throughput of urea can be increased significantly with only some minor modifications in the plant, thanks to UAS in situ synthesis. The increase can be as high as 10-15%.

However to increase further the urea capacity of a given plant would require heavier investments since, for example, the urea reactor itself would become a bottleneck.

Grades of UAS Products

To be able to increase interestingly the urea global throughput, the "connecting point" (synthesis of UAS) to the existing urea process (either gaseous flow containing $NH_3$, $CO_2$ and steam, or a liquid feed containing urea, water and unconverted reactants free or as carbamate) must be selected according to the UAS grade desired. The amount of AS synthesized must allow to fully neutralize the $NH_3$ (free or linked as carbamate and ammonia emitted by some urea decomposed) introduced in the UAS section in order to fully earn on the water recycling to the urea synthesis. In other words, the less AS required in the final product the more downstream the "connecting point" to the urea process has to be chosen.

If the amount of AS to be synthesized exceeds the ammonia available at the exit of the HP stripper, then it can be supplied by different ways, typically by adding more ammonia to the urea reactor, enhancing moreover the urea conversion yield (see hereabove).

If AS is synthesised in the urea synthesis reactor or in the HP stripper, then the recycling of unwanted water to the reactor cannot be limited and there is no gain on the urea global throughput. Moreover it brings potential corrosion problems in a high pressure, high temperature, sophisticated and expensive equipment by the introduction of sulphuric acid. Even the working conditions in urea reactor and BP stripper are highly alkaline, the introduction of acid may create local acidity, especially by unsteady working conditions (start up, shutdown, incident, etc), which could strongly damaged the equipment.

Therefore the UAS in situ synthesis is not to be performed in HP area but downstream in a low investment pipe reactor, where corrosion is under control, and which can be cheaply replaced if corrosion or damages.

Urea Losses, Pipe Reactor Technology, Evaporator Selection

The UAS production allows increasing the global urea capacity. However, the synthesis of AS within a matrix of urea solution can face urea decomposition too. This decomposition is due to hydrolysis, biuret formation and further polymerisation, or action of the sulphuric acid. High residence time and high temperature are well known to increase the unwanted decomposition of urea.

The key of the UAS process is therefore to manage to produce AS without decomposing too much urea, and a low urea decomposition rate is required for an economical in situ UAS production.

According to the different routes described hereunder, a decomposition rate of not more than 0% to 15% maximum has been obtained.

Mainly two types of reactors may be foreseen, either a tank neutralizer or a pipe reactor, to perform the in situ production of UAS.

In addition to urea decomposition an additional problem of potential corrosion may appear, thus cost of maintenance and repair may result.

Compared with tank neutralizer, the pipe reactor technology presents numerous advantages to answer those problems:

Low retention time,

High mixing degree, i.e. a quicker neutralization

Flexibility of operation (easy start up/shutdown)

Low investment cost,

Lower static load on the building structure (volume of retention)

Easy to replace when corroded.

The pipe reactor is therefore the technology that has been selected and studied to develop the AS in situ synthesis.

If such a synthesis means high urea losses, an in situ process may totally lose any interest. Therefore the pipe reactor has to be designed in such a way that the reaction can be selective, to promote the reaction of the acid with the unconverted ammonia rather than to decompose the urea molecules.

A pipe reactor is defined mainly by its length, its diameter and the design of its introduction head. The material must be selected carefully, since the working conditions are according to the location in the reactor hot, acidic, corrosive and abrasive. The length must give enough time for the reaction to perform, the diameter must give enough turbulence and a degree of mixing for the reaction to perform quickly and efficiently. The introduction head must improve the contact between the reactants. In any case the sulphuric acid is introduced in the center and in the axis of the reactor in order to limit the contact between unreacted acid with the wall of the reactor.

In case of the ammonia to be neutralized into AS is supplied as free ammonia or by carbamate contained in the carbamate/urea solution, it is specially designed to get an high mixing degree at the head of the reactor in order to limit the contact time between free acid and urea.

If the ammonia to be neutralized into AS is supplied as a flow separate from the urea flow, e.g. gaseous ammonia as single component or together with steam and $CO_2$, the mixing head is designed to enhance the contact between ammonia and sulphuric acid before contacting the urea flow. Therefore the flow can be described as a double annulus flow: the acid flow is in the center, the ammonia flow is in the first annulus, the urea flow in the second annulus. In that way, the droplets of acid pre-react with ammonia, and the heat released by the reaction is absorbed by the water present in the urea solution, creating steam, volume expansion and beneficial turbulence in the length of the reactor.

The pipe reactor can be built in different alloys or in internally coated steel, e.g. Teflon lined or ceramic lined.

Depending on the water content of the urea solution used and on the amount of AS synthesized allowing to evaporate part of the water, an evaporator may be required to achieve the right water content for the melt to the granulator.

On one hand low residence time in the evaporator is required to avoid extra decomposition of urea, on the other hand ammonium sulphate may crystallize during the evaporation. An evaporator where crystallization occurs must be designed with a much longer residence time than an evaporator where such phenomena doesn't occur, therefore the evaporator must remain free of crystallization to be designed with a short residence time, such as e.g. falling film type or rising film type.

As a consequence, the amount of AS synthesized in the urea solution prior to the evaporator, if any, cannot exceed some limit depending on the water content acceptable at the exit of the evaporator.

Global Plant Improvement

The synthesis of UAS allows in addition to improve some by-streams of the urea plant. Indeed a urea plant always produces some off gases containing ammonia that are classically vented to atmosphere, and the synthesis of UAS allows to use such gases and to avoid an atmospheric pollution.

Moreover, according to the connecting point to the urea process and to the strength of sulphuric acid used, then some addition of water may be required to absorb the heat released by the AS synthesis. Thus, UAS production allows recycling of e.g. weak carbamate solution that otherwise should be hydrolyzed before ejected to environment.

The invention will be further described with reference to the figures.

Three (1, 2, 3) UAS Routes

Figure 2:
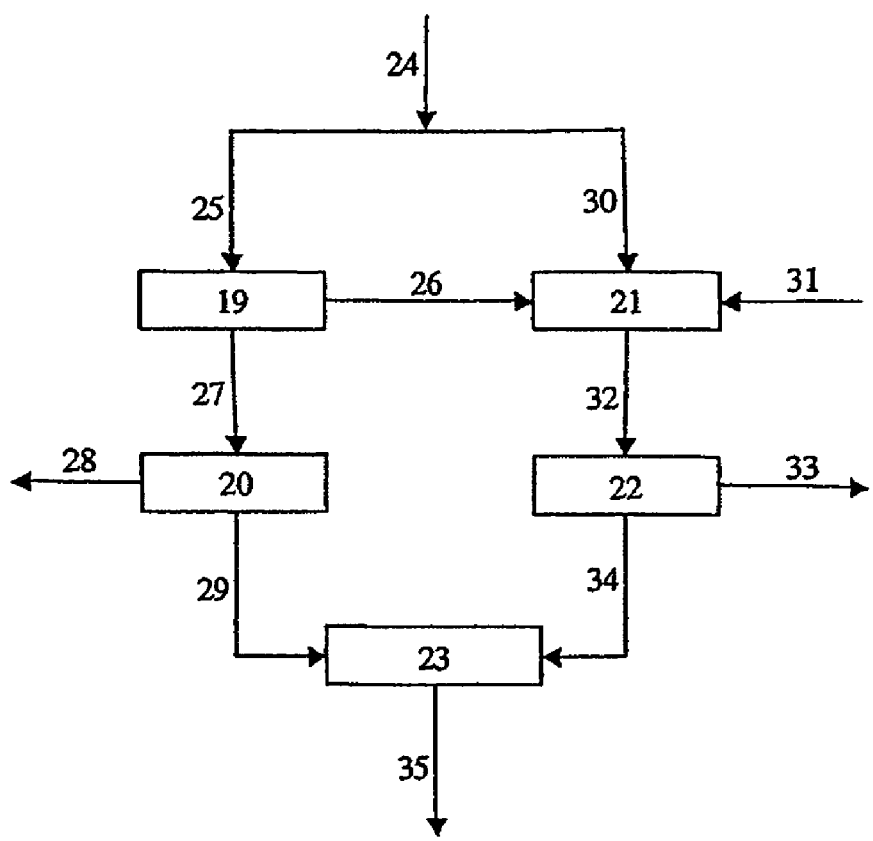
FIG. 2 shows a schematic representation of the process with in situ synthesis of UAS in the urea carbamate recycled solution using one pipe reactor.
Figure 3:
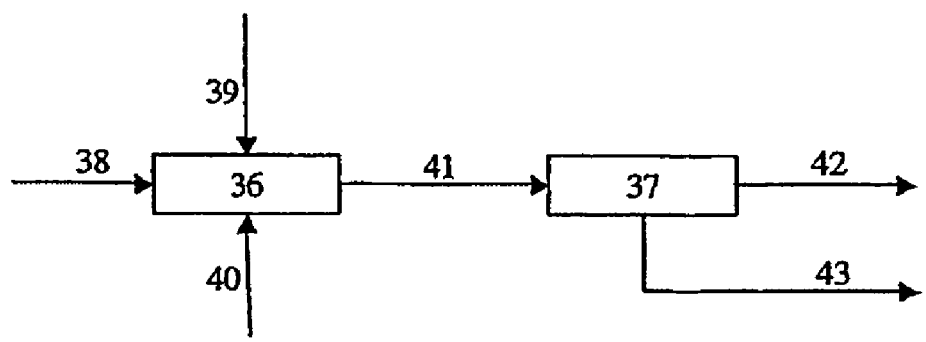
FIG. 3 shows a schematic representation of the process with in situ synthesis of UAS in the final urea solution after carbamate stripping.

FIGS. 1-3 show three different modifications for the urea synthesis process. The process modifications will be described hereafter, based on the example of a Stamicarbon urea process (e.g. Stamicarbon as described for example in the "fertilizer manual", chapter IX, edition printed in 1998 by IFDC). Concentrations, temperatures and pressure are relative to that process, but can be extended to others.

The content of AS can vary from some percent to 60% for the three routes. Neutralization of the total free ammonia and carbamate gives a concentration of AS varying between some and 35% depending on the urea synthesis process.

In all three routes, some elemental sulphur (0 to 50% of total final product) may be added to the UAS slurry just before it is to be sprayed into the granulator or in the granulator. Sulphur acts in the process like an inert filler and its addition at this stage does not influence the urea and UAS processes. In the final product, it acts as a slow S-release fertilizer, allowing availability of sulphur to the crop during the whole season, first by sulphate immediately available, second by sulphur slowly oxidized by the bacteria of the ground. To allow such bacteria digestion in a reasonable time, the sulphur must be finely divided, less than 50 μm, preferably with a mean diameter of 10 μm or less for temperate climate, 25 μm or less for tropical climate.

Sulphur can be added in the UAS processes:
before the pipe reactor in the urea solution,
after the pipe reactor in the separator as a protecting film to limit abrasion on the vessel wall,
in the UAS line to the granulator,
sprayed in the granulator by specific nozzles.

In the first three cases, some mixing in the UAS line to a granulator has to be provided to finally disperse the elemental S into small (10 μm) droplets with addition of additives to avoid coalescence before spraying as described in the patent (see WO03106376). Such addition is easy to implement in an existing plant. In the last case, the granulator must be provided with dedicated nozzles for sulphur spraying.

Route 1

FIG. 1 shows a schematic representation of the processes. Synthesis of AS is performed in the urea/carbamate/water solution 7. The slurry produced 18 is sent to the granulation process.

The UAS synthesis process is divided in three main steps. The urea solution 7 is flashed in a first separator tank 1, (for instance a LP stripper). The liquid stream 9 from the outlet of the separator tank 1 enters a first pipe reactor 2. Sulphuric acid 12 is introduced to the pipe reactor 2 leading to AS in urea products UAS. The vapor phase 8 from the first separator 1, which contains $NH_3/CO_2$ is sent to a second pipe reactor 5, partially or totally according to the amount of AS that should be synthesized.

The liquid stream 14 from the separator 3 of the pipe reactor 2 enters the second pipe reactor 5, where vapor phase from first separator 1 and sulphuric acid 11 are injected to synthesize additional 10-15% AS in order to reach the grade of 23% AS in the final product 18. The heat of reaction and a final flash 6 enables to concentrate the stream 17 from 90 to 95-99.5% dry matter, preferably 97%, resulting into a slurry 18 to be sprayed in the granulator. As the separator 6 is operating under vacuum, the vapors 15 cannot be recovered as process steam. They are simply scrubbed and the scrubbing solution is recycled to the second pipe reactor 2 or 5.

The urea 7 is flashed in a first separator tank 1 at less than ~15 bar abs. The urea solution 9 concentration is around 55%. The AS amount that is possible to synthesize with the ammonia (free and linked as carbamate) available in the solution represents some % AS to more than 35% AS. In the first pipe reactor 2, typically some % to 15% AS only are produced in order to remain free of crystallization in the evaporator 4.

The amount of carbamate in the liquid 9 depends on the pressure of the first separator/LP stripper 1 (VIE data—Vapour Liquid Equilibrium). The released heat of the reaction in the pipe reactor 2 and the flash in flash separator 3 (at a pressure between 0.1 to 10 bars abs) induce water evaporation. This steam 15 contains large amount of ammonia and carbon dioxide. To be used as process steam, it should be free of ammonia. An acidic scrubber using sulphuric acid would therefore be required, but the ammonium sulphate solution produced by the scrubber should then be recycled into the evaporator 4. In such case, the amount of AS gets too high and crystallization may occur. Therefore this steam 15 cannot be scrubbed and cannot be valorized as utility.

The solution concentration at evaporator inlet 14 is between 60 and 80% dry matter if 23% AS has to be produced in the final product 18.

The outlet solution from the pipe separator 14 is fed to an evaporator 4 working under vacuum (0.1-0.5 bar abs).

The evaporator 4 concentrates the solution up to 90% dry matter 16. The vacuum in the evaporator is such that the concentrated solution temperature does not exceed 130° C. (at such composition UAS 90/10 to 85/15 and 10% water, the AS content is still completely soluble).

Some imported LP steam supplies the required heat for evaporation.

If less than 10-15% AS is desired in the final product 18, then the first pipe reactor 2 is not used. If between 15% and 35% AS is desired the two reactors (2 and 5) will be used as described above.

If more than 35% AS is desired in the final product 18, additional ammonia has to be supplied through additional injection of ammonia and further neutralization with sulphuric acid 11. Additional ammonia can be for example either fed through the urea synthesis reactor or directly supplied from storage into the pipe reactor 5. Moreover, if large amount of AS is synthesized, the heat from the reaction gives sufficient evaporation capacity to work-without evaporator 4. In such case, this route resumes itself to a single pipe reactor (Route 3).

Route 1 presents a large flexibility in terms of UAS grades (some % to 60%): the amount of AS synthesized in the first pipe reactor 2 is intentionally limited in order to avoid unwanted crystallization in the evaporation step 4, but the second pipe reactor 5 allows to adjust the grade 18 and the evaporator 4 to adjust the water content. The route 1 does not allow recovery of process steam.

Route 2

FIG. 2 shows a schematic representation of the processes. Synthesis of AS is performed in the urea/carbamate/water solution 24. The slurry produced is sent to the granulation process.

The synthesis process is divided in two main steps. The urea solution steam 24 from a high pressure stripper (HP) is divided in two separated streams, one third 30, two thirds 25 in case 23% AS is the desired grade in the final product 35.

Two thirds 25 enter a low pressure (LP) stripper 19, where the remaining carbamate is decomposed and stripped in vapour ($CO_2/NH_3$) phase 26. The liquid flow 27 exiting the LP stripper 19 enters an evaporator 20 to be concentrated. The 95-99.5% dry matter concentrated urea solution 29 is pumped to a mixing tank 23. The vapour phase 26 is fed to a pipe reactor 21.

The second of the two streams 30, one third of global feed, is flashed at less than 15 bar and enters a pipe reactor 21. The vapours 33 exiting the reactor separator 22 are scrubbed with sulphuric acid to stop the ammonia, before being further processed or vented as a mixture of steam and carbon dioxide. The vapours 33 from pipe reactor separator can be acidly scrubbed from ammonia and used as heating medium in the urea solution concentrator if the separator is operated under pressure. In that way, the heat of reaction is valorised twice: first by concentration of the solution at the outlet of the pipe reactor, second by using the process steam, free of ammonia after acidic scrubbing.

The reaction in the reactor 21 between liquid sulphuric acid flow 31 and ammonia produces 35% AS 34 in order to get, after dilution by urea solution 29 in final mixing tank 23, 23% AS in the final product 35.

The heat of reaction and the vapour pressure control in the pipe reactor separator 22 allow to concentrate the solution 30, from 55-70% dry matter, preferably 65% dry matter to a 80-90% dry matter UAS slurry 34, more if the separator 22 is under atmospheric or even vacuum. The slurry 34 is then sent to the mixing tank 23 with the concentrated urea 29 and the resulting mixture 35 can be sprayed into a granulator.

In case the final grade desired is less than 23% AS, then the plant has to be designed in order to obtain the neutralisation of all the free ammonia available in the relevant stream 30. The global stream 24 has then to be divided accordingly.

For example in case the final grade desired is more than 23% AS, then the global stream 24 may be divided for example ⅔ and ⅓ instead of ⅓ and ⅔. Moreover, part of flashed vapours from the other stream 26 and containing $NH_3$, $CO_2$ and water can also feed the pipe reactor 21. This possibility gives some flexibility for higher UAS grade by this route.

Both routes 1 and 2 as shown in FIGS. 1 and 2, can be implemented in a typical urea synthesis process. The amount of AS synthesised in a urea solution range from some % AS to 35% AS in case of in situ synthesis in a typical urea synthesis process without supply of additional ammonia Higher AS content can however be achieved if additional ammonia, or solutions containing carbamate, and corresponding sulphuric acid are injected in the pipe reactor.

Urea yield is increased as consumption of carbamate in the UAS process modifies the composition of the recycled stream and decreases the water amount reintroduced in the urea synthesis reactor with the recycling. Less carbamate has to be stripped off the urea solution, while stripped gases are normally condensed to be recycle to the urea reactor, thus both routes save some cooling water.

Route 2 allows utilities recovery by operating the pipe reactor separator under pressure: the steam 33 produced by the reaction can be valorised in the plant at pressure ranging from 2 to 10 bars abs, preferably 5, at 0.5-0.7 ton of steam per ton of AS synthesized.

Route 3

FIG. 3 shows a schematic representation of the processes. Route 3 is a final unit operation added to the typical urea synthesis process. This operation is fed by unconcentrated or partially concentrated urea solution 38 from urea process and produces directly UAS solution or slurry 42 ready to be sprayed/granulated. Unconverted ammonia 39, after stripping of carbamate, coming from urea synthesis process can be used as an ammonia source. As a consequence the urea synthesis process yield is increased with 10-15%.

As shown on the FIG. 3, three distinct flows enter a pipe reactor 36. Urea solution 38 comes from urea synthesis process. The urea solution fed to the reactor is more or less concentrated (60-80%) depending on the required AS content (some % to 60% AS) in the final product. For high UAS grade, external water (e.g. weak carbamate solution) has to be added to absorb the heat released by the ammonium sulphate synthesis.

Concentrated liquid sulphuric acid 40 enters the reactor 36 simultaneously with ammonia 39 coming from carbamate recycle of the urea process.

$NH_3$ can be mainly fed to the UAS pipe reactor 36 as a virgin component feed or as a gaseous stream 39 comprising ammonia, $CO_2$ and steam in various compositions according to the connecting point to the existing urea process.

The heat of the reaction released and the vapour pressure (0.5-0.3 bar abs) control in the separator 37 induce water evaporation 43 and enable solution or slurry 41 concentration below 140° C. and so limits important urea losses. This solution or slurry is concentrated to several percent water content before being fed to the granulation process 42.

The pipe reactor separator 37 is operated under vacuum to achieve the right water content in the melt 42 that is sent to the granulator without any further concentration step.

If the amount of non condensable (e.g. carbon dioxide) is high, it is possible to work with two successive flash: the second one is operated under vacuum to achieve the right water content, while the first flash 37 directly at the pipe reactor outlet is operated under slightly positive pressure in order to strip most of the non condensable 43 prior to the vacuum system, the vapours being in any case acidly scrubbed before vented or reuse.

Route 3 can be very easily implemented in a typical urea synthesis process since it is a tail end process. It enables to produce a range of final product grades of UAS products. The amount of AS synthesised in urea solution range from some % to 60% AS.

The process allows flexibility regarding formulations and final product grade since only the required gaseous ammonia to obtain the right grade is added. If the gaseous steam exiting the carbamate stripper, composed mainly of ammonia, carbon dioxide and steam, is partially or totally used in the UAS production, then less water is recycled to the urea reactor and the urea yield is increased. Stripped gases from carbamate stripping are partially or totally used to synthesize UAS, while they are normally condensed to be recycled to the urea reactor. Some cooling water is thus saved.

The invention claimed is:

1. A method for the production of solid urea ammonium sulphate (UAS) fertilizers, which comprises
forming urea by reacting $CO_2$ and $NH_3$ in a urea reactor and subsequent carbamate stripper, and forming ammonium sulphate (AS) in situ by reacting $H_2SO_4$ and $NH_3$, free and/or as carbamate, in a reactor downstream of the carbamate stripper, wherein liquid effluent, containing urea, from the carbamate stripper is sent to the reactor for forming AS which is supplied with $H_2SO_4$ and additional $NH_3$ such that reaction heat from the AS-formation is fully exploited for concentrating the urea and AS-solution, and then the urea and ammonium sulphate (AS) is mixed and particulated to form solid UAS-particles.

2. The method according to claim 1, wherein the point of integration of ammonium sulphate production in the urea production process is chosen according to the desired product composition.

3. The method according to claim 1, wherein the reaction is carried out in a pipe reactor where the head of the reactor enhances the chemical reaction between sulphuric acid and ammonia and the urea solution surrounds the ammonium sulphate formation.

4. The method according to claim 3, wherein the pressure drop through the reactor is between 0 and 10 bars and the temperature of the reactor is kept between 120 and 200° C.

5. The method according to claim 1, wherein additional ammonia is fed either through the urea reactor or directly to a pipe reactor to achieve higher content of AS in the UAS.

6. The method according to claim 1, wherein elemental sulphur divided into fine droplets is added to the UAS.

7. The method according to claim 6, wherein the droplets are <50 μm.

8. The method according to claim 6, wherein elemental sulphur is divided into fine droplets before granulation by mixing in the line and coalescence avoided by addition of adequate additive, or directly co-sprayed with UAS in the granulator.

9. The method according to claim 1, which is carried out utilizing an increased throughput of ammonia to increase the formation of urea in the reactor, by using surplus ammonia rich carbamate for the formation of ammonium sulphate, without recycling carbon dioxide to the synthesis.

10. The method according to claim 1, which is carried out utilizing an increased throughput of ammonia to increase the formation of urea in the reactor by using surplus ammonia rich carbamate for the formation of ammonium sulphate, recycling surplus carbon dioxide to the synthesis through an expansion in carbon dioxide compressor capacity.

11. The method according to claim 1, wherein urea solution is flashed in a first separator tank, before liquid urea/carbamate solution is reacted with sulphuric acid in a first pipe reactor, a liquid stream from the separator of the pipe reactor enters a second pipe reactor, where vapour phase from a first separator and sulphuric acid is injected, to produce more UAS, before concentration and particulation.

12. The method according to claim 11, wherein 1-35 weight % AS is produced in the second pipe reactor.

13. The method according to claim 11, wherein the heat of reaction for AS is utilized for concentration of the UAS-solution.

14. The method according to claim 1, wherein a part of a urea/carbamate/water stream from the urea reactor is reacted with sulphuric acid to make UAS-slurry, while carbamate from the other part of the stream is decomposed, the resulting urea solution concentrated and mixed with the other stream before particulation of UAS.

15. The method according to claim 14, wherein the stream is divided ⅓-⅔ to ⅔-⅓ or in any proportion between these values.

16. The method according to claim 14, wherein a vapour phase from the carbamate decomposition is supplied to the pipe reactor.

17. The method according to claim 14, wherein the heat of reaction for AS and vapour pressure control in the pipe reactor separator allows concentration of the UAS solution.

18. The method according to claim 7, wherein the droplets are 10-25 μm.

19. A method for the production of solid urea ammonium sulphate (UAS) fertilizers, which comprises forming urea by reacting $CO_2$ and $NH_3$ in a urea reactor and subsequent carbamate stripper, and forming ammonium sulphate (AS) in situ by reacting $H_2SO_4$ and $NH_3$, free and/or as carbamate, in a reactor downstream of the carbamate stripper, wherein liquid effluent, containing urea, from the carbamate stripper is sent to the reactor for forming AS which is supplied with $H_2SO_4$ and additional $NH_3$ such that reaction heat from the AS-formation is fully exploited for concentrating the urea and AS-solution, and then the urea and ammonium sulphate (AS) is mixed and particulated to form solid UAS-particles, which method is carried out utilizing an increased throughput of ammonia to increase the formation of urea in the reactor, by increasing the N/C ratio and extracting surplus ammonia from a water containing carbamate recycle stream for ammonium sulphate formation.

* * * * *